(12) United States Patent
Criswell

(10) Patent No.: US 7,900,875 B2
(45) Date of Patent: Mar. 8, 2011

(54) POWER GENERATING AND DISTRIBUTION SYSTEM AND METHOD

(76) Inventor: David R. Criswell, Houston, TX (US)

( * ) Notice: Subject to any disclaimer, the term of this patent is extended or adjusted under 35 U.S.C. 154(b) by 576 days.

(21) Appl. No.: 11/184,158

(22) Filed: Jul. 18, 2005

(65) Prior Publication Data

US 2006/0038083 A1 Feb. 23, 2006

Related U.S. Application Data

(60) Provisional application No. 60/589,919, filed on Jul. 20, 2004, provisional application No. 60/602,772, filed on Aug. 19, 2004.

(51) Int. Cl.
*B64G 1/44* (2006.01)
(52) U.S. Cl. .................................. 244/172.7; 455/13.1
(58) Field of Classification Search ............ 244/172.7, 244/172.8; 136/244, 292, 246; 60/281, 39.52; 455/12.1, 13.1, 13.3, 13.4
See application file for complete search history.

(56) References Cited

U.S. PATENT DOCUMENTS

| | | | |
|---|---|---|---|
| 3,933,323 A * | 1/1976 | Dudley et al. ................. | 244/1 R |
| 3,989,994 A | 11/1976 | Brown | |
| 4,187,506 A | 2/1980 | Frosch et al. | |
| 4,371,135 A * | 2/1983 | Keigler ....................... | 244/172.8 |
| 4,836,470 A | 6/1989 | Criswell | |
| 5,019,768 A * | 5/1991 | Criswell et al. ............... | 322/2 R |
| 5,223,781 A | 6/1993 | Criswell et al. | |
| 5,224,663 A | 7/1993 | Criswell | |
| 5,570,102 A * | 10/1996 | Kochiyama et al. .......... | 343/880 |
| 6,492,940 B2 * | 12/2002 | Mikami et al. ............... | 342/354 |
| 6,664,101 B2 * | 12/2003 | Wild ........................... | 435/262.5 |
| 6,727,425 B2 * | 4/2004 | Takada et al. ................. | 136/244 |
| 7,216,833 B2 * | 5/2007 | D'Ausilio et al. ......... | 244/171.1 |
| 7,456,803 B1 * | 11/2008 | Sievenpiper ................... | 343/909 |
| 2004/0156400 A1 * | 8/2004 | Caplan et al. ..................... | 372/5 |

OTHER PUBLICATIONS

Komiyama, Koji et al. "Microwave Earth-to-Earth Power relay Satellite Assessment", Space Energy and Transportation, vol. 1, No. 4-1996.*
Mankins, John C., "A Fresh Look At Space Solar Power", IEEE, 1996.*
Glaser, P.E., "The Power Relay Satellite," Space Power USA, vol. 13, No. 1-2, pp. 1-23 (1994).
Hashimoto, K., et al., "Direction Finding System for Spread Spectral Pilot Signals From Multiple Microwave Power Receiving Sites," Proceedings of the 2000 Symposium on Antennas and Propagation, IEICE of Tokyo, Japan, vol. 3, 2000, pp. 1199-1202 (2000).
Komiyama, K., et al., "Microwave Earth-to-Earth Power Relay Satellite Assessment," Space Energy & Transportation High Frontier, vol. 1., No. 4, pp. 424-434 (1996).

(Continued)

*Primary Examiner* — Tien Dinh
*Assistant Examiner* — Philip J Bonzell
(74) *Attorney, Agent, or Firm* — Gordon & Rees LLP

(57) ABSTRACT

A system and method of generating and distributing power includes one or more microwave power transmitters at locations on Earth adjacent natural fuel or power resources such as natural gas, oil, solid fuel, or geothermal energy. The fuel or energy source is converted into electricity on site, and the electricity is then converted into microwave power beams transmitted from the microwave power transmitter towards a redirector satellite in orbit about the Earth. The redirector satellite then sends one or more microwave beams to rectennas located in consumer nations at appropriate sites for feeding the power grid or to additional redirector satellites for directing to rectennas located on the far side of the Earth.

1 Claim, 9 Drawing Sheets

OTHER PUBLICATIONS

Mankins, J.C., "A Fresh Look at Space Solar Power," Energy Conversion Engineering Conference, Proceedings of the 31st Intersociety, vol. 1, pp. 451-456 (1996).
PCT International Search Report and Written Opinion, PCT/US2005/025525 (Mar. 16, 2007) (24 pages).
Criswell, D.R., "Solar Power via the Moon," In The industrial Physicist, Apr./May 2002, pp. 12-15.
Ehricke, K.A., "Use of Shuttle in Establishing Large Space Installations," in Space Shuttle Payloads, vol. 30, Science and Technology, Proceedings of Symposium at Annual Meeting of American Association for the Advancement of Science, Dec. 27-28, 1972, pp. 397-428.
Ehricke, K.A., "Regional Power Distribution via Power Relay Satellite," in Los Angeles Council of Engineers and Scientists Proceedings Series, 1975, vol. 1, pp. 204-209.
Hyypia, J., "Iceland's Heat Energy: Solution to a Future Crunch?" in Science and Mechanics, Summer 1979, pp. 49-51 and 106-107.
Rogers, T.F., "Reflector Satellites for solar Power," IEEE Spectrum, Jul. 1981, pp. 38-43.
Glaser, P.E., "The Power Relay Satellite," Plenary Lecture, 44$^{th}$ Congress of the International Astronautical Federation, Oct. 16-22, 1993, pp. 1-12.
Wireless Energy Transfer; paper; Jun. 1, 2008; 12 pgs; Wikipedia.
Hurst; Is Wireless Power Closer Than We Think?; paper; May 2, 2008; 4 pgs; CleanTechnica.com.
Hanley; Drilling Up Into Space; paper; Dec. 26, 2007; 13 pgs; Associated Press.
Wilson; How Wireless Power Works; paper; Jun. 6, 2008; 4 pgs; howstuffworks.
Dinkin; Rectifying the case for beaming lunar solar power; Article; Apr. 11, 2005; 11 pgs; The Space Review.
Muller et al,; Power Beaming Using FELs; paper; 2003; 9 pgs; Particle Beam Physics Lab.
How to harvest solar power? Beam it down from space!; paper; Jun. 6, 2008; 3 pgs; Peak Oil.
Farrar; How to harvest solar power? Beam it down from space!; paper; Jun. 6, 2008; 4 pgs; CNN.
Table Top Solar Power Beaming Project; paper; Jun. 6, 2008; 5 pgs; The Moon Society.
Project Status; Table Top Solar Power Beaming Demonstrator Project; paper; May 11, 2008; 15 pgs; The Moon Society.
Microwave Power Transmission; paper; Mar. 20, 2008; 3 pgs; Wikipedia.
Budimir; Research Activities and Future Trends of Microwave Wireless Power Transmission; paper; Oct. 18, 2006; 5 pgs; Sixth International Symposium Nikola Tesla.
In-Depth Analysis of Microwave Power Transmission & Solar Power Satellite Systems; paper; 2008; 3 pgs; Business Wire.
Terrestrial Microwave Power Transmission System Units; paper; Jun. 6, 2008; 2 pgs; Satellite Communication Systems.

* cited by examiner

POWER GENERATING AND DISTRIBUTION SYSTEM AND METHOD

CROSS-REFERENCES TO RELATED APPLICATIONS

This application claims the benefit of priority of U.S. Provisional Application Ser. No. 60/589,919 filed Jul. 20, 2004, and U.S. Provisional Application Ser. No. 60/602,772 filed Aug. 19, 2004, the contents of both of which are incorporated herein by reference in their entirety.

BACKGROUND OF THE INVENTION

The present invention is directed to a method and system for generating power and distributing the power to populated areas where it is needed, and to the use of the method to enable the deployment of a lunar solar power system by means of electric energy from Earth in support of a transportation system between the Earth, space, and the Moon, and also to provide support for operations on the Moon.

It is estimated that, by the year 2050, a prosperous world of 10 billion people will require at least 20 TWe of electric power. Currently, electricity is generated using fuel such as oil, natural gas, nuclear energy, and coal, with a small amount being generated by renewable energy sources such as solar, wind, or hydroelectric facilities. Independent oil companies face increasing hurdles to maintaining access to significant natural reserves of oil and natural gas, due to the geopolitical distribution of such resources. Additionally, the recovered fuel must be transported safely to an electric power-generating facility which is typically remote from the recovery site, and often in a different country. This involves pipelines, ships, tankers and the like. Such transportation is expensive both to install and maintain, and is potentially dangerous as a result of accidents, sabotage or terrorism. Finally, progressive exhaustion of readily accessible fossil fuel resources requires exploration to attempt to find new sources of such fuels. The struggle to locate and develop new sources of gas and oil will increase in difficulty over time, as such resources continue to be depleted by world power demands and population increases. This has resulted in progressively higher prices and shortages in the power supply to the world population, and this problem is expected to become worse with time.

The present invention is related to my prior U.S. Pat. Nos. 5,019,768 and 5,223,781 directed to a Power Collection and Transmission System and Method, and the contents of these patents are incorporated herein by reference. In these patents, the power collection system comprises solar power collecting stations which convert solar power into low intensity beams of microwaves. The microwave beams are directed to a microwave receiver or rectenna that converts the beam into electricity. A rectenna is a field of closely spaced antennas that rectifies microwaves into electricity. U.S. Pat. No. 5,019,768 describes a lunar based solar power system using microwaves to deliver commercial power to the Earth. Such a system is far less environmentally intrusive, much safer, and more dependable than a terrestrial solar power system. Additionally, a solar power collection system on the Moon has the major physical advantage of being able to use orbital mirrors to concentrate sunlight on the solar-to-electric converters, due to the airless and cloudless lunar surface. It is much easier to make very thin mirrors than to make solar-to-electric converters. The latter devices require high purity silicon and other rare materials such as selenium, gallium, tellurium, cadmium, and germanium. The reflectors can concentrate the sunlight so that less area of solar cell is needed per unit of power output.

One potential problem with initial construction of a lunar based solar power collection and transmission system is the cost of deploying the necessary equipment to the Moon and establishing the solar power stations on the Moon.

SUMMARY OF THE INVENTION

It is an object of the present invention to provide a new and improved energy transportation system for redistributing energy from one Earth-based location to another.

It is a further object of the invention to provide a less expensive means of transporting equipment from the Earth into space, and particularly to the Moon, in order to allow a lunar-based solar power station to be completed in time to provide significant power to the Earth to reduce and eventually eliminate the dependence on fossil fuel supplies.

According to one aspect of the present invention, a power distribution system is provided, which comprises at least one source of electricity, at least one microwave transmitter for converting the electricity into at least one microwave beam and directing the beam in a selected direction and at least one orbiting redirector satellite for receiving the directed microwave beam. The redirector satellite has a transmitter for converting the received microwave beam into a plurality of outgoing microwave beams and directing the outgoing beams towards selected targets.

The electricity source, which may be an electricity-generating unit, and microwave transmitter in an exemplary embodiment are located on the Earth, but may be located on any celestial body, or in space. The targets may be receiver units on the Earth, on the Moon, additional redirector satellites in orbit about the Earth or the Moon, orbital, Earth-to-orbit or space transportation vehicles, or the like.

According to another aspect of the present invention, a method of transporting energy is provided, in which fuel from a natural source of energy such as oil, natural gas, methane, solid fuel, or a power source such as geothermal, nuclear, or renewable energy, is extracted from the source and converted into electricity at a first location on Earth, and the electricity is then converted into one or more microwave power beams at the same location. Each beam is directed to a redirector satellite in orbit about the Earth, which need not be in geosynchronous orbit. The redirector satellite then aims multiple microwave power beams to selected targets. The targets may be rectennas located in various consumer locations around the Earth, one or more relay satellites to direct beams to receivers on the far side of the Earth through two or more relay steps, orbital vehicles, Earth-to-orbit vehicles or space transportation vehicles, lunar base stations, and/or orbital redirector satellites in orbit about the Moon.

This system will significantly reduce the cost of producing and distributing electricity from various naturally occurring fuel sources. In the current system, fuels such as oil and gas are typically transported by pipes, ships, trucks, rail or the like from their source to one or more power distribution locations in major consumer nations. Additionally, electricity produced by solid fuel, geothermal, or nuclear power plants, or renewable systems, is often transported over large distances through power lines. The current Earth-based energy transportation system requires major physical assets such as pipelines, ships, rail lines, tanker trucks, power lines, and the like, which are expensive to construct initially, as well as to maintain and protect. The system of this invention avoids the Earth-based infrastructure for transporting energy or fuel over large distances on Earth, and instead converts the fuel or energy source into electricity at its source, then converts the electricity into microwave beams which are directed from Earth onto one or more redirector satellites orbiting the Earth. Rather than transporting atoms, this system transports photons, which is much faster and more efficient.

The microwave energy is received then selectively redirected onto receiver stations on Earth which are located near the consumer. The beamed power can be redirected, on a second-by-second basis, to the markets needing the power, avoiding the need for long distance Earth transportation of large volumes and weights of fuel. Further, the microwave energy of this system has essentially no latency and can almost instantaneously be redirected as compared with the latency of oil in a pipeline, for example.

The beam redirector is deployed from Earth and assembled in low orbit about the Earth. In an exemplary embodiment of the invention, the assembled beam redirector may be transported from low Earth orbit into high orbit or geosynchronous orbit by a low-cost ion-drive type transport vessel, such as proposed by W. Brown (Brown, W. C. A Transporttronic Solution to the Problem of Interorbital Transportation, NASA CR-191162/pt-7452, FIG. 1-11, July 1992). This transport vessel can be powered by microwave beams transmitted from the transmitters on Earth.

According to another aspect of the present invention, a unified power-generating and distributing system is provided, which comprises at least one combined power extracting, converting, and transmitting facility adjacent a source of fossil fuel, the facility having an extraction unit for extracting the fossil fuel, an electricity-generating unit located adjacent the extraction unit for converting the fuel into electricity, and a microwave beaming unit adjacent the electricity-generating unit for converting the electricity into at least one microwave beam, the beaming unit including a beam director to direct the microwave beam, at least one redirector satellite orbiting the Earth for receiving the microwave beam, and a plurality of rectenna receiver stations on Earth for receiving microwave beams and converting the beams into electricity, the satellite having a beam directing apparatus for directing plural microwave beams to selected rectenna stations depending on current power requirements. The microwave beam may be relayed through at least two redirector satellites before being directed onto selected rectenna receiver stations.

In an exemplary embodiment of the invention, the power facility also has a collector for collecting waste gases such as carbon dioxide and pressurized gases or steam produced by the electricity-generating unit, and an injection device for injecting the waste gases back into the buried fossil fuel supply, which may be an oil field, natural gas field, or coal supply. This will result in enhanced recovery of fossil fuel from a depleted field, as well as reducing or eliminating pollution of the atmosphere as a result of gases which would otherwise be released from the electricity-generating unit. Chemicals that release oil from porous rock can be manufactured using the power and chemicals released during power production.

It is well known that, for all oil fields, most of the oil still remains after primary recovery (natural pressurization and pumping) and secondary recovery (usually water flooding) techniques have reached their limits. Studies have indicated that more oil can potentially be recovered using carbon dioxide injection than is extracted using primary and secondary recovery techniques. By providing the electricity-generating facility at the same site as the oil field or other fossil fuel supply, a supply of pressurized carbon dioxide and other gases can be recovered on site at little expense and used immediately for injection into the oil field or the like for enhanced extraction. This also reduces or eliminates pollution from the gaseous byproducts of electricity generators such as steam turbines or the like.

Sequestration of carbon dioxide, or long term storage of carbon dioxide in underground tanks or natural reservoirs, has been proposed in order to reduce atmospheric pollution. Up to now, the fossil fuel industry has tended to consider sequestration of carbon dioxide as an undesirable expense which may restrict the electricity-generating business. It would be extremely expensive to capture carbon dioxide from the flue gas and then transport it back to the fossil fuel source for sequestration. The method and system of this invention provides for electricity generation at the same site as the fossil fuel source, so that it is much more economical to capture the flue gas and inject it back into the fossil fuel supply or other fuel reservoir, such as an oil field. This will also have the benefit of enhanced oil or other fuel recovery, which more than counteracts the cost of the carbon dioxide capture and sequestration.

The terrestrial power generation and microwave beaming system and method may be readily adapted to provide an inexpensive power for space transportation purposes in addition to electrical power supply to consumers on Earth. Additionally, power beams may be aimed directly from the Earth to lunar bases or redirector satellites orbiting the Moon. This may make construction of the lunar solar power station described in the above identified patents more feasible. Additional redirector satellites in orbit may be used to support space operations or to transmit power directly to rectenna stations on the Moon.

The microwave beam or several such beams can be directed from the Earth-based transmitter sites and/or orbiting satellites to power a cargo vessel to transport necessary equipment from the Earth to the Moon, for construction of a lunar based power collection and transmission system as described in my prior patents referenced above. An ion-drive cargo vessel with a rectenna on the side will receive a beam of microwaves from a succession of beaming sites on the Earth and in space in order to provide power to drive the vessel from low Earth orbit into orbit about the Moon. After the equipment has been transported from the vessel to the lunar surface by suitable landing vehicles the vessel may be returned to low Earth orbit. Although the journey will take longer than a conventional rocket system, this system will dramatically reduce the mass of propellant needed and the cost for deploying equipment to the Moon, since complex rockets and their large loads of fuel and equipment are eliminated.

BRIEF DESCRIPTION OF THE DRAWINGS

The present invention will be better understood from the following detailed description of some exemplary embodiments of the invention, taken in conjunction with the accompanying drawings in which like reference numerals refer to like parts and in which.

DETAILED DESCRIPTION OF THE INVENTION

Figure 1:
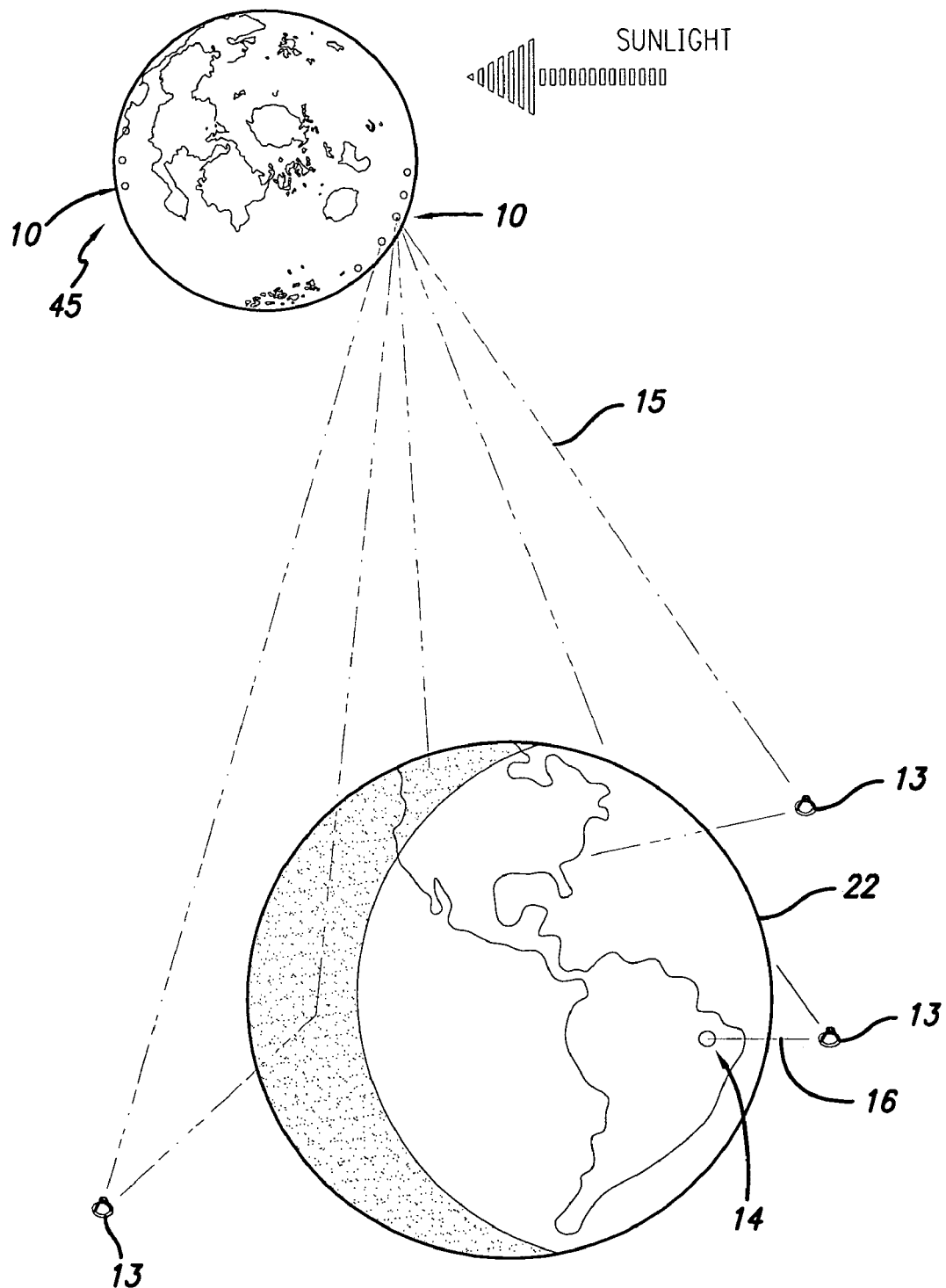
FIG. 1 is a schematic illustration of a prior art lunar power collection and transmission system.
Figure 2:
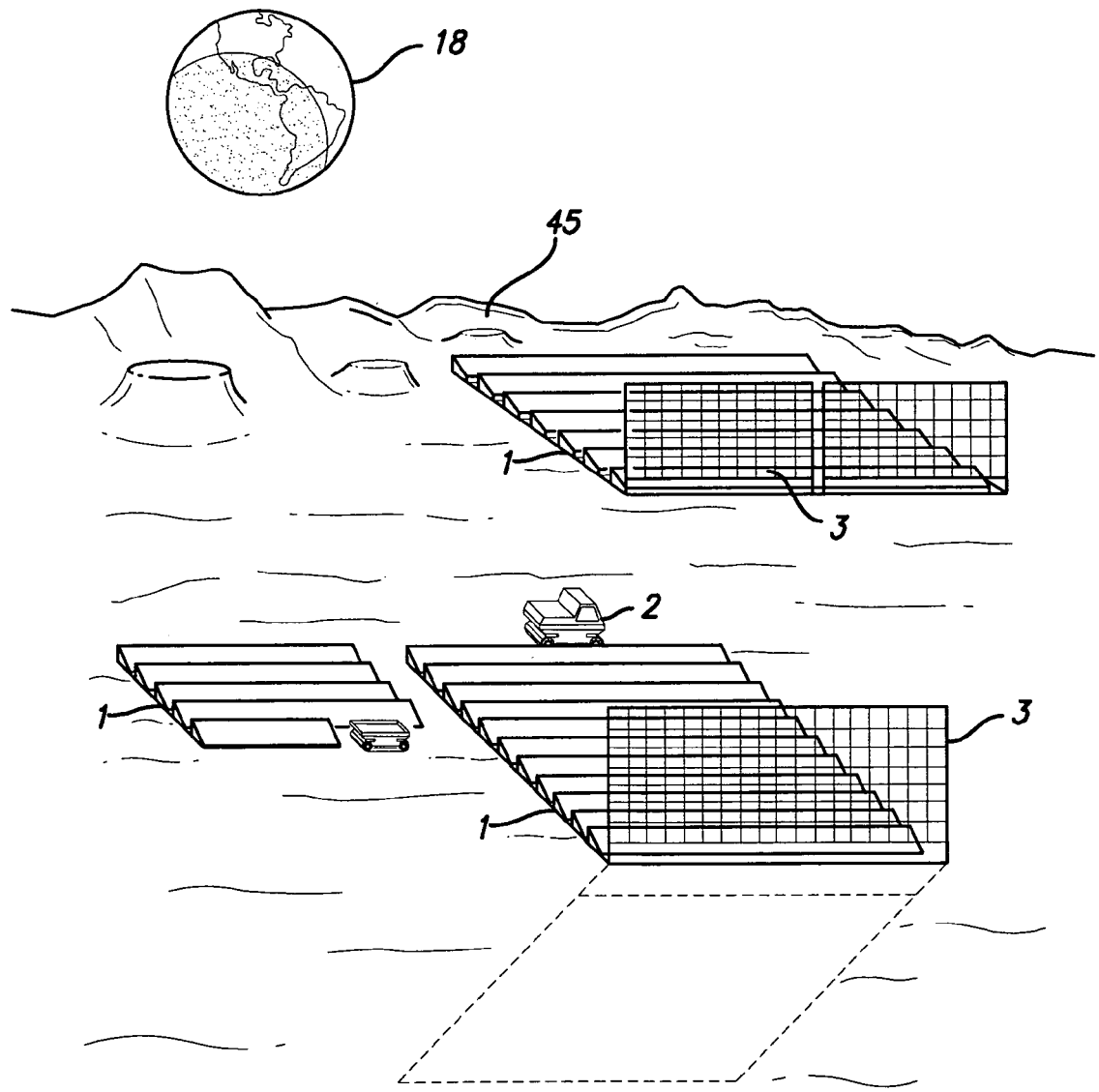
FIG. 2 is a schematic illustration of a power collection and transmission station on the Moon.

FIGS. 1 and 2 are schematic illustrations of a prior art power collection and transmission system as described in my U.S. Pat. Nos. 5,019,768 and 5,223,781, the contents of which are incorporated herein by reference. As illustrated in FIG. 1, solar power collecting and microwave transmitting stations 10 are provided on the Moon 45, and transmit microwave power beams 15 to orbiting redirectors 13 from which the beams 16 are transmitted onto selected small receiver or rectenna stations 14 on Earth 22. FIG. 2 illustrates an exemplary solar power collecting and microwave transmitting station on the Moon. The station comprises photovoltaic arrays or solar collectors 1, microwave transmitters 2, and a microwave reflective screen 3, as well as buried wiring.

With reference to FIG. 2, for the purpose of this application the term "far side" as applied to a first celestial body such as the Earth 18 or the Moon 45 means to the side which faces away from a second body or a specific location on the first body and is not in the line of sight of that body or location, the second body being another celestial body or an orbital satellite in orbit around the first body or second body.

Figure 3:
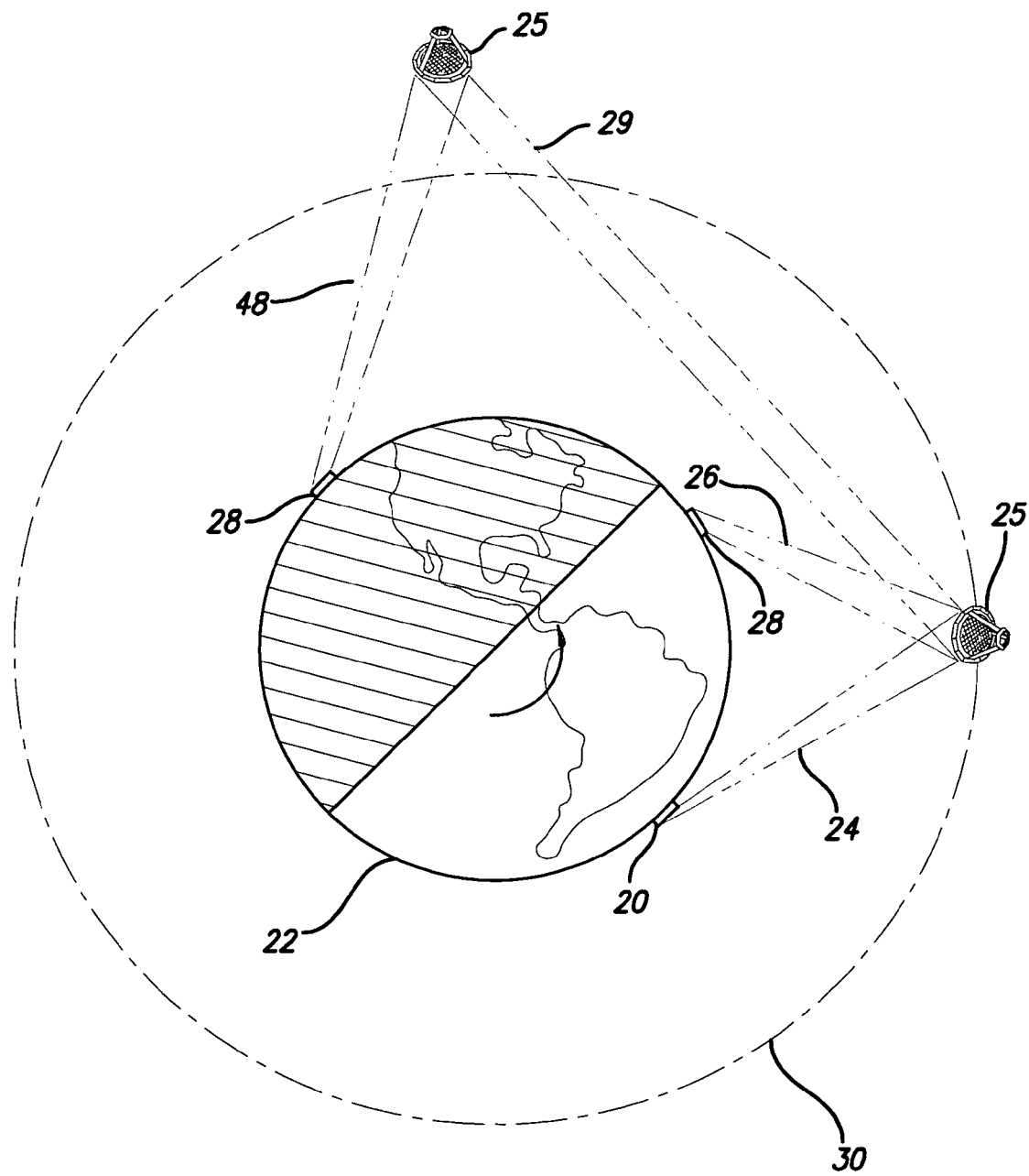
FIG. 3 illustrates an Earth-based energy transportation or distribution system according to an exemplary embodiment of the invention.

FIG. 3 illustrates an Earth-based energy transportation or distribution system and method according to an exemplary embodiment of the invention. Although the system and method as described below refers to power generation and transmission from Earth, it will be understood that this system may alternatively be based on other planets, moons or other celestial bodies. The system need not be attached to a surface of a celestial body and could be free floating in space in other embodiments.

In the exemplary embodiment of FIG. 3, one or more power-generating stations 20 are based on Earth 22 at the site of a natural fuel source, such as an oil or natural gas field, or coal mine, or other natural power source of power such as a geothermal reservoir, wind source, solar source, or the like. For the purpose of this application the term "power-generating station" means any suitable electricity-generating unit for converting any power source into electricity and any suitable device for converting the electricity into a microwave beam and directing the power beam to any selected target. The power generating station may include other devices in some embodiments, such as a waste gas recovery system. Each station 20 includes a converter or electricity-generating unit for converting the natural power source to electricity, a microwave antenna structure for converting the electricity into microwaves, and directing microwave beams 24 towards an orbiting redirector satellite 25 which is in low Earth orbit, high Earth orbit or geosynchronous orbit 30 about the Earth.

The stations 20 will be suitable for terrestrial operations. Each beam illuminates the redirector satellite, which receives the incoming microwave energy then sends one or more outgoing beams 26 to receivers or rectenna stations 28 located near consumers. The redirector satellite 25 can also send a power beam 29 to one or more additional redirector satellites 25 that can also redirect a beam 48 to a second receiver 28 that cannot directly view the first redirector satellite 25 (i.e. a receiver or rectenna station on the far side of the Earth from the first redirector satellite). The terrestrial transmitters 20 can be built using commercial vendors of microwave components, or in a similar manner to the lunar transmitters described in my prior U.S. patents referenced above. The arrangement is such that the receiver or rectenna stations are located in the near field of the microwave beam, as described in my prior U.S. Pat. No. 5,019,768 referenced above.

The microwave beams produced in this system are suitably around 12 centimeters in wavelength, which will pass through clouds, rain, fog, and dust, with little absorption. Nominally, the beams will have less than twenty percent of the intensity of sunlight at noon, and will dependably deliver power to the rectenna stations, which are several hundred meters or more in diameter. Each rectenna station converts at least 85% of the microwave power it receives into electricity and provides the electricity to local and regional power grids.

A rectenna station 28 comprises a field of closely spaced antennas that will rectify the microwaves into electricity and output the electrical power to the local power grid. Rectennas have been demonstrated to be capable of converting around 85% of an incident microwave beam into 1,100 We/m$^2$ of electric power. The rectenna may be constructed in a plot of land in a commercial or farming area to feed clean electric power to a region.

Figure 4:
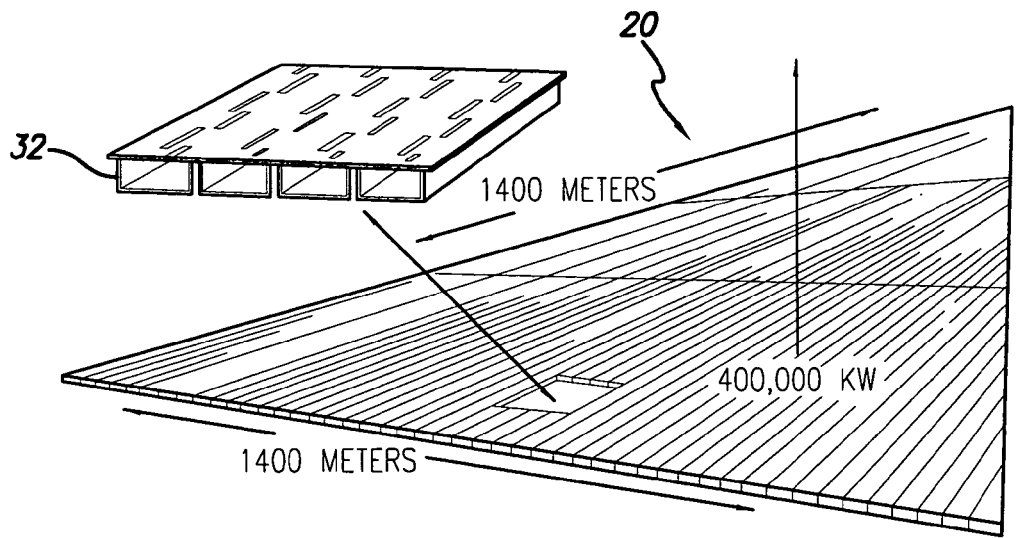
FIG. 4 illustrates a segment of a flat faced square array for microwave power beaming.

FIG. 4 illustrates part of a flat-faced, square array which may be used for microwave power beaming from station 20 of FIG. 3. This type of microwave power beaming array is described by Brown, W. C. (1994) A Transportronic Solution to the Problem of Interorbital Transportation, NASA Contract NAS3-25066, Raytheon Corp., 166 pp. The array comprises a series of slotted waveguides 32 forming a flat-faced array which can project a 400 MWe beam of microwaves to the receiver or the redirector satellite in orbit. This particular array geometry can sweep the beam 60 degrees to the east and west off the vertical. The slotted waveguides may be produced from thin-wall, sheet aluminum by a rolling and die-cutting process.

The redirector satellites 25 that orbit the Earth and receive power beams from stations 20 can retransmit the received power to multiple rectennas 28 on Earth in order to provide power anywhere on Earth. The redirector satellites eliminate the need for energy storage. These satellites do not have to be in geosynchronous or fixed orbit, which would limit where the power beam could be directed. Instead, the satellites 25 are in a wide range orbit and can provide power beams to any location on Earth. The redirector satellites 25 can also send power beams to one or more secondary satellites to redirect the beam to a receiver that cannot directly view the first satellite.

There are three general types of redirector which may be used in the satellites 25. The first is an orbital mirror, which directly reflects the beam back towards Earth. It would be necessary to constantly aim the mirror with high precision using ion-drives and reaction wheels. It is reported that reflectors of greater than 100 m. diameter have been flown (Criswell, D. R. (1998) Lunar Solar Power System for Energy Prosperity in the 21st Century, 17th World Energy Congress, Houston, Tex., http://www.worldenergy.org/wec-geis/publictions/default/tech-papers/17thcongress/4_1_33.asp)

The second option for a redirector is an orbital rectenna which can convert the beam to electricity and then power an associated microwave transmitter that rebroadcasts one or more beams toward the receiver on Earth. The "Synthetic Aperture Radar", flown on three flights of the space shuttle, has demonstrated the transmission of microwave power toward Earth. Criswell, D. R. (July 2002) Energy Prosperity within the 21st Century and Beyond: Options and the Unique Roles of the Sun and the Moon, *Innovative Energy Strategies for $CO_2$ Stabilization*, R. G. Watts, Editor, Cambridge University Press, Chapter 9, pp 345-410.

Figure 5:
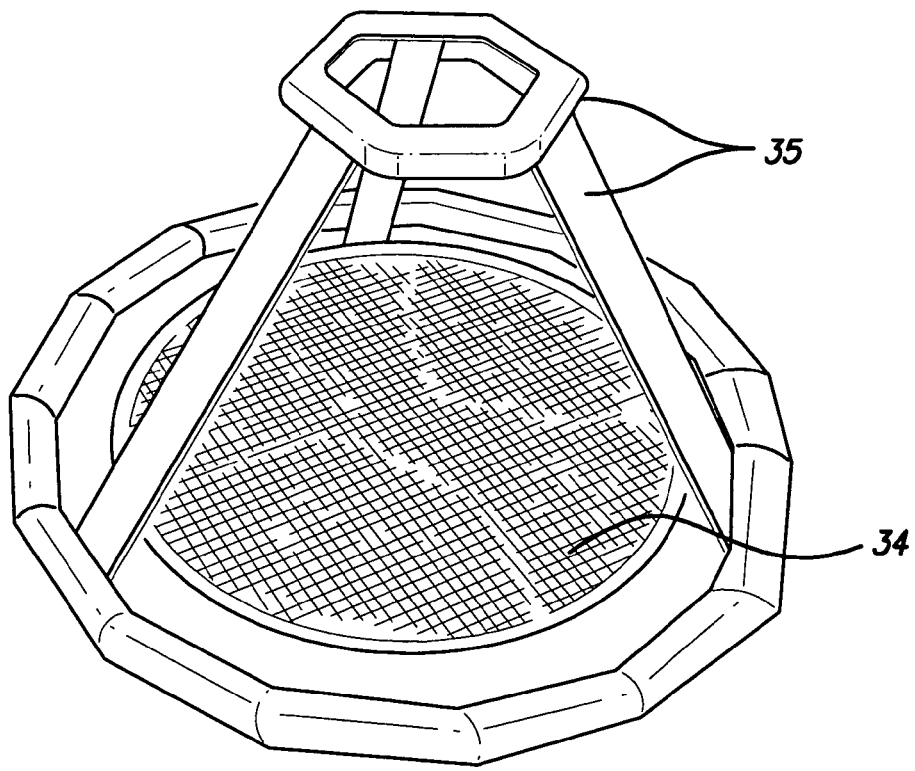
FIG. 5 illustrates a possible orbital redirector for use in the system.

The third option is a reflect-array 34 as illustrated in FIG. 5 (NASA (1999) Inflatable Reflectarray Antennas, NASA Tech Briefs, October 1999, http://www.nasatech.com/Briefs/Oct99/NPO20433.html). This invention is an array of solid state microwave circuits that can receive a single intense beam of microwaves and divide that power directly into multiple outgoing microwave beams. The outgoing beams can be independently directed towards different targets. FIG. 5 is an illustration of a prior art prototype of a reflector array which re-configured may be used in the system of this invention. The reflector array of FIG. 5 was demonstrated at Jet Propulsion Laboratory, Pasadena, Calif. in 1999. The prior art device comprises a one meter diameter planar array of X-band micro-strip circuitry printed on a circular plastic membrane. The flexible membrane 34 is held flat by the inflated plastic torus 35.

Reflect-arrays eliminate large electrical currents that can interact with plasma in the magnetosphere. They can potentially approach 98% conversion efficiency of the primary power beam 24 into individually directed beams 26. A reflect-array will degrade slowly but can be repaired while in full operation. Reflect-arrays can eliminate the need for high precision physical antennas and greatly decrease the physical mass and complexity of the transmission system.

Figure 6:
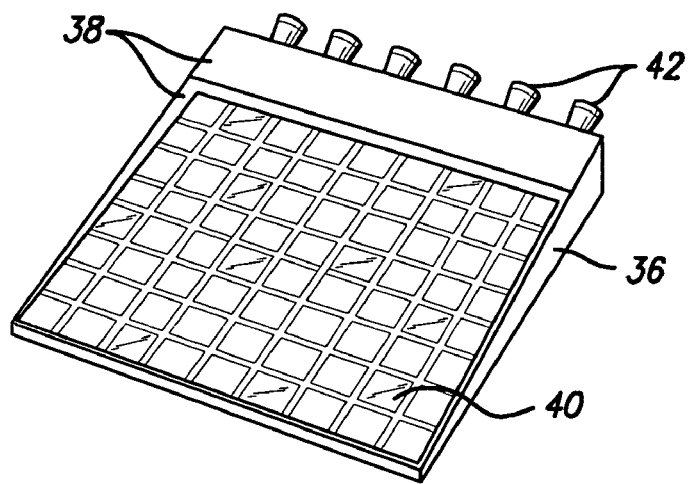
FIG. 6 illustrates an ion-drive transport vessel which may be used for transport of materials and movement of orbital redirectors from low Earth orbit into high orbit.

The beam redirector components for the reflect-array must be deployed from Earth and assembled in low orbit about the Earth. It will consist of low mass extensible trusses, similar to those used to support the solar arrays of the International Space Station. The trusses support the reflect-array printed circuitry that receives a power beam and then generates multiple independent power beams. Once assembled, the beam redirector can be deployed to high orbit about the Earth. This can be done by an ion-drive transport, such as proposed by W. Brown (Brown, W. C., A transportronic solution to the problem of interorbital transportation, NASA Contract NAS3-25066, Raytheon Corp., 166 pp.). A suitable cargo vessel can use an ion drive 36 such as illustrated in FIG. 6 (see Brown, W. C., supra). The cargo vessel would be permanently based in space. The vessel comprises low mass trusses 38, printed circuitry rectennas 40, and ion thrusters or rocket-like nozzles 42. Although the ion thrusters 42 are relatively large in FIG. 6, this is for illustration purposes only, and the thrusters 42 would be replaced in practice by hundreds of small individual thrusters. A known ion drive vessel is currently using solar energy to power the European SMART-1 spacecraft towards and into orbit about the Moon.

In the system according to the exemplary embodiment of the present invention, one or more cargo vessels 36 travel between low orbit about the Earth and deep space, and never return to the surface of Earth. Each vessel may be an ion drive vessel and is powered by the same microwave facilities 20 on Earth that are used to transfer natural source energy about the Earth. The microwave power received by the rectennas provides power for the ion drives. The ion drive vessel can also be used as a space tug by attaching it to a second vessel and powering it to a new trajectory.

The rectenna 40 of the cargo vessel would be around 220 m on a side. It may receive a beam of 400 $W/m^2$ from a succession of beaming sites along the Earth equator. This cargo vessel may be used to place beam redirectors 25 in high orbit about the Earth. A 1 km. diameter (or on a side) redirector would have a mass of around 300 tons. The redirector components would be built on Earth, launched on several flights of the space shuttle or space shuttle derived vehicles, and assembled in low Earth orbit. The redirector is then carried on a vessel 36 into the desired orbit.

Figure 7:
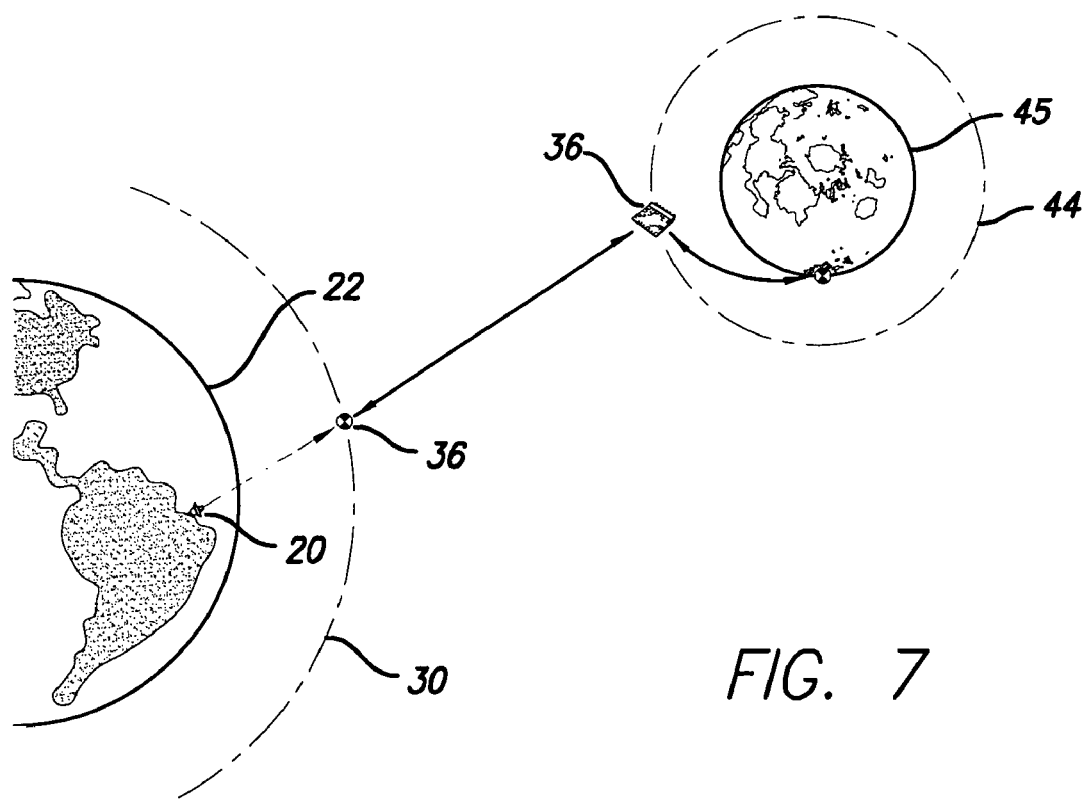
FIG. 7 illustrates a system for using microwave beam energy from the Earth to transport equipment to the Moon for construction of a lunar power station.

This technique may be expanded to allow economical transportation of materials to the Moon for a lunar power station, which could supplement and eventually take over from Earth based power generation using fossil fuel sources. FIG. 7 illustrates a method of transporting equipment to the Moon for constructing a lunar power station of the type described in my two prior patents described above, using ion-drive cargo vessels 36 as illustrated in FIG. 6, or a flying wing vehicle of the type described in U.S. Pat. No. 4,836,470 of Criswell, the contents of which are incorporated herein by reference. Such a vehicle may be modified to incorporate an ion drive. Alternatively, a vehicle provided with a means for receiving an external propellant supply may be used, for example the vehicle described in U.S. Pat. No. 5,224,663 of Criswell, the contents of which are also incorporated herein by reference.

Figure 12:
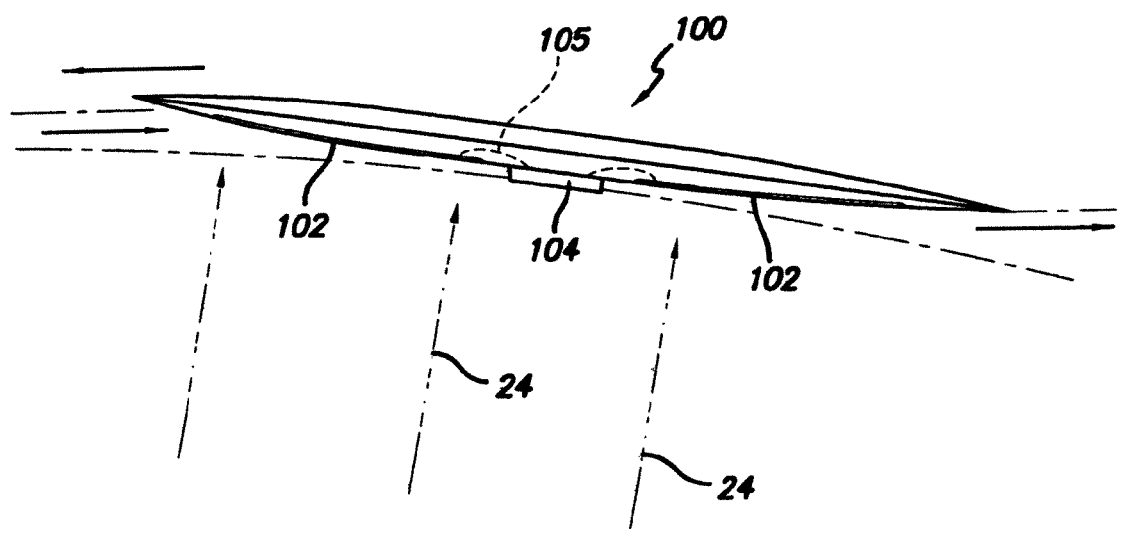
FIG. 12 illustrates an aerospace craft which can be powered by a microwave beam from the power distribution system of FIG. 8.
Figure 13:
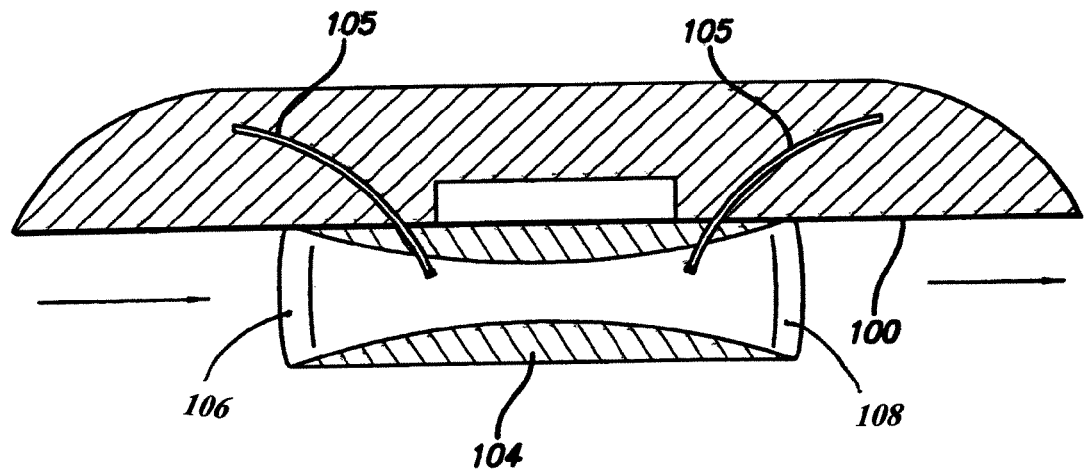
FIG. 13 is a cross section of the thrust chamber of the aerospace craft of FIG. 12.

FIGS. 12 and 13 illustrate a flying wing 100 which has rectennas 102 embedded in its bottom surface. These rectennas receive a power beam 24 from Earth and output electric power that is fed to engine 104 via leads or electric lines 105. An electric arc (see FIG. 13) generated by the electric power is used to heat the air that flows through engine 104 from entrance 106 to exit 108. The heated air exiting the engine delivers thrust to the vehicle without the need for onboard propellants.

A microwave beam from one or more transmitter stations adjacent power stations on Earth may be directed to heat the atmosphere proximate to the vehicle to provide a propulsive mass to drive the vehicle out of Earth's atmosphere. The vehicle may be provided with an ion drive which can be powered directly by the microwave beam when the vehicle leaves Earth atmosphere. Once the vehicle arrives at Moon orbit, it may land to deliver the payload.

The microwave transmitters 20 about the Earth can power the same ion-drive cargo vessels used for deploying the redirectors 25 into low orbit 44 about the Moon 45, and then return them into low orbit 30 about the Earth. Material and equipment needed for construction of a lunar solar power collection and transmission system as schematically illustrated in FIG. 2 and described in my prior patents can be transported into low Earth orbit via space shuttle or similar vehicles, and loaded onto one or more ion-drive cargo vessels 36. Microwave power beams from Earth can be directed onto the rectenna 40 of each cargo vessel, providing power to the ion drive to convey the cargo vessel into low orbit about the Moon.

The basic energy or power transporting system illustrated in FIG. 3 completely eliminates the expense of safe transportation of natural gas in a liquefied form from its source to a power plant, and allows the energy produced by natural gas and other naturally occurring energy sources to be quickly redistributed to any desired location on the Earth. The system completely eliminates the need for gas liquefying and re-expanding facilities as well Earth-based transportation systems such as trucks, ships, trains, pipelines, and the like, which are expensive both to build and maintain.

With this system, the natural gas in a major field can be converted into electricity on site, and the electricity can then be converted into microwave power beams. This completely eliminates the cost of transporting the gas in its natural form. Each beam illuminates a redirector satellite 25, which then sends one or more microwave beams to rectennas 28 at appropriate locations. Power beaming avoids the liquefaction and transport of cryogenic gas onboard ships or through pipelines. The beamed power can then be re-directed, on a second-by-second basis, to the markets needing the power. Although particularly advantageous for transporting energy produced by natural gas or oil, the system may also be used for transport of energy from power stations fueled by coal or geothermal energy. Delivering energy by means of the power beam completely eliminates the need to control physical pollution from power production in the region that receives this clean power, and leads to reduced environmental damage and associated costs.

Figure 8:
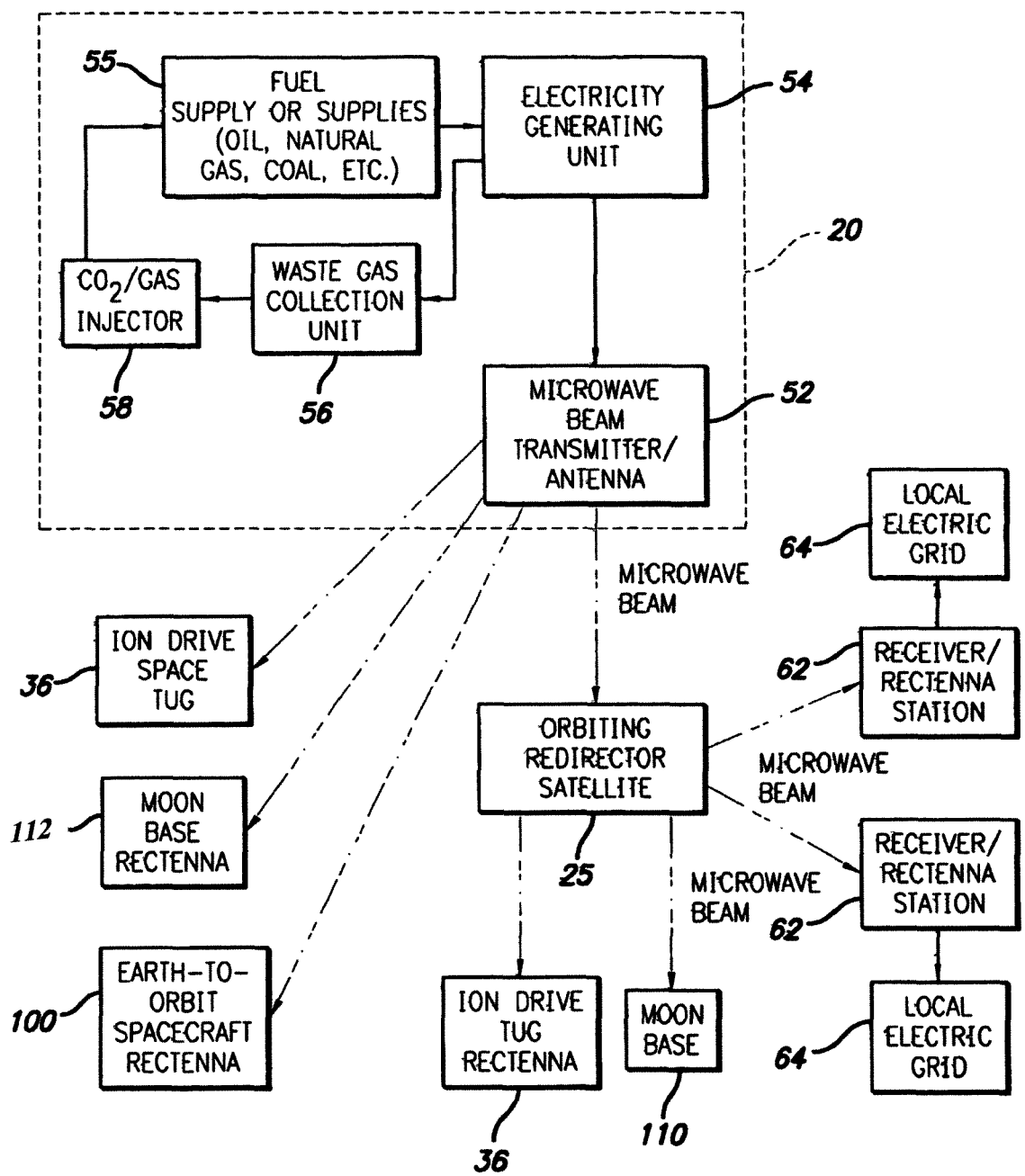
FIG. 8 is a block diagram of a power-generating and distribution system according to another embodiment of the invention.

FIG. 8 illustrates a modified power-generating and distribution system according to another embodiment of the invention. The system includes one or more unified facilities or stations 20 for power generation and microwave power transmission. As in the embodiment of FIG. 3, station 20 includes an electricity-generating unit 54 and a microwave power transmitter or antenna array 52 associated with the electricity-generating unit. The unit 54 is adjacent a natural fuel supply or power source 55. The electricity-generating unit, microwave beam transmitter, and/or fuel or power source may be as close together that they are touching one another, or may be spaced apart by 1,000 miles or more, although they are at a spacing of a few miles in the exemplary embodiment.

In this embodiment, the unified power facility also has a collection unit 56 for collecting waste gases such as carbon dioxide and pressurized gases or steam produced by the electricity-generating unit 54, and an injection device 58 for injecting the waste gases back into the buried fossil fuel supply 55, which may be an oil field, natural gas field, coal field or mine, or other fuel supply field in the region. The injector may return carbon dioxide, other waste gases and other materials to the original fuel supply field and/or to other natural fuel reservoirs that have been partially depleted. For example, reinjection of waste gases into a natural gas field does not enhance recovery. Therefore, if the primary fuel source is a natural gas field, collected waste gases may be transported and injected into an oil or coal field. This will result in enhanced recovery of fossil fuel from a depleted field, as well as reducing or eliminating pollution of the atmosphere as a result of gases which would otherwise be released from the electricity-generating unit. In order to further enhance fuel recovery, chemicals that release oil from porous rock can be manufactured using the power generated as well as chemicals released during power production.

The waste gas collection unit may capture carbon dioxide and other waste gases from the flue gas of an electric power plant, in a manner known in the field, and store the captured gas in tanks or the like. (See Herzog and Golomb, Carbon Capture and Storage from Fossil Fuel Use, The Encyclopedia of Energy, Vol. I, pages 277-287, Elsevier Inc. 2004). The injector may comprise a series of pumps and pipes for pumping the waste gases from the collection unit into the buried fossil fuel supply.

Sequestration of carbon dioxide, or long-term storage of carbon dioxide in underground reservoirs, has been proposed in order to reduce atmospheric pollution from power plants. Up to now, the fossil fuel industry has tended to consider sequestration of carbon dioxide as an undesirable expense which may restrict the electricity-generating business. It would be extremely expensive to capture carbon dioxide from the flue gas and then transport it back to the fossil fuel source for sequestration. The method and system of this invention provides for electricity generation at the same site as the fossil fuel source, so that it is much more economical to capture the flue gas and inject it back into the fossil fuel supply, such as an oil field. This will also have the benefit of enhanced oil or other fuel recovery, which more than counteracts the cost of the carbon dioxide capture and sequestration.

The upper limit of the spacing between the fuel or power source, electricity generating unit, and microwave transmitter is determined by the following performance criteria:

Prformance Criteria

Life Cycle $E_T$=Total amount of energy that can be extracted from the primary reservoir and/or enhanced recovery reservoir.

$E_P$=Total energy required to build, maintain, operate and close down the gathering, generation, reinjection and beaming system. This includes energy consumed in meeting environmental requirements.

$E_D$=Energy delivered to the beam.

$E_D=E_T-E_P$ Must be positive or >0 for the system components to be "adjacent".

$E_P$=increases as the collection and reinjection systems increase in length and tonnage of materials transported over the life of the energy system.

"Adjacent" is limited by the requirement that $E_D>0$. This must be estimated for each system of fuel reservoirs, fuel collection systems, generation system, waste collection and transport and reinjection.

In the exemplary embodiment, the fuel or power source, electricity-generating unit, microwave transmitter and waste gas collector (if present) are contiguous or in relatively close proximity, i.e., at a spacing of no more than a few miles. However, it will be understood that these units may be at much larger spacings in other embodiments, as long as the requirement that $E_D>0$ is met.

As in the previous embodiment, the microwave transmitter 52 is controlled to direct one or more microwave beams to one or more orbiting redirector satellites 25, which then send one or more microwave beams to receivers or rectenna stations 62 at appropriate locations where power is delivered to a local electric grid 64. Both the redirector satellites 60 and the rectenna stations 62 may be identical to those described above in connection with the previous embodiment. The relatively simple rectennas of the receiver stations can be placed over deserts, shallow bays, industrial centers, or contaminated land. If placed over agricultural land, the rectennas can prolong the growing season and, as needed, release extra waste heat to protect against freezes. Transmitter 52 may also transmit power beams directly to an ion drive space tug 36, a rectenna within an Earth-to-orbit spacecraft 100, or directly to a lunar base rectenna 112 for powering lunar operations. Similarly, orbiting redirector satellites 25 may also transmit power beams to ion drive space tug rectennas 36, rectenna of Earth-to-orbit spacecraft 100 or directly to a lunar base rectenna 110.

Since the power distribution system of this invention is based in space, it does not intrude into diverse political regions where construction of a transportation system and protection of the system may be difficult. The system also does not require major physical assets that must be constructed, maintained, and protected. Power can be readily sold to both baseload and peak users. The system can also be enhanced to provide for transportation to and from low orbit about the Earth and beyond, and provides power for transporting payloads to the Moon for various construction purposes, such as construction of a lunar solar power station. The system may also be used to transmit power from a first lunar solar power station to a second lunar station which is currently on the dark side of the Moon, facing away from the sun. A microwave power beam from the first station is directed to an orbital redirector satellite, and a second microwave power beam may be directed from the satellite to the second station or relayed via a second redirector satellite if necessary.

The intensity of the microwave beam directed to each rectenna can be made approximately constant over the area of the rectenna. The arrangement is such that each rectenna station is positioned in the near field of the microwave beam, i.e. at a distance R which is less than about $D^2/\lambda$, where D is the diameter of the effective radiating aperture and $\lambda$ is the wavelength of the microwaves. The beam or beams emitted from the satellite can be electronically steered to one or more desired rectenna stations, as described in my U.S. Pat. No. 5,223,781 referenced above.

Figure 9:
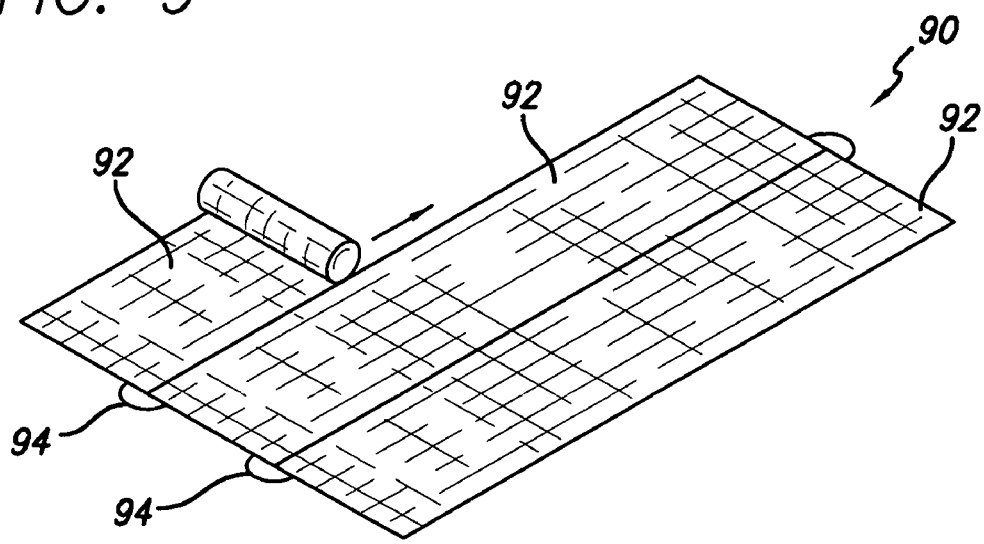
FIG. 9 illustrates a temporary rectenna system for providing a temporary power facility.

FIG. 9 illustrates a temporary rectenna facility 90 which may be set up as needed for temporary power requirements such as natural disasters, explorations of remote areas, or military applications. The rectenna facility comprises a plurality of panels 92 of woven electrically insulating material, such as a netting or a Mylar® applied with an appropriate conductive surface. The panels may be prefabricated and stored until needed. Cross connectors 94 may be provided between adjacent panels. A temporary power facility could be set up quickly and easily simply by laying the panels 92 on the ground, as indicated in FIG. 9. The location of the rectenna could then be identified to an orbiting redirector satellite at a suitable position, and a power beam could be quickly directed to the temporary rectenna. The temporary rectenna facility can also be set up on the Moon and receive power directly from transmitters on Earth or through redirector satellites 25. Other types of rectennas can also be employed and manufactured on the Moon.

Figure 10:
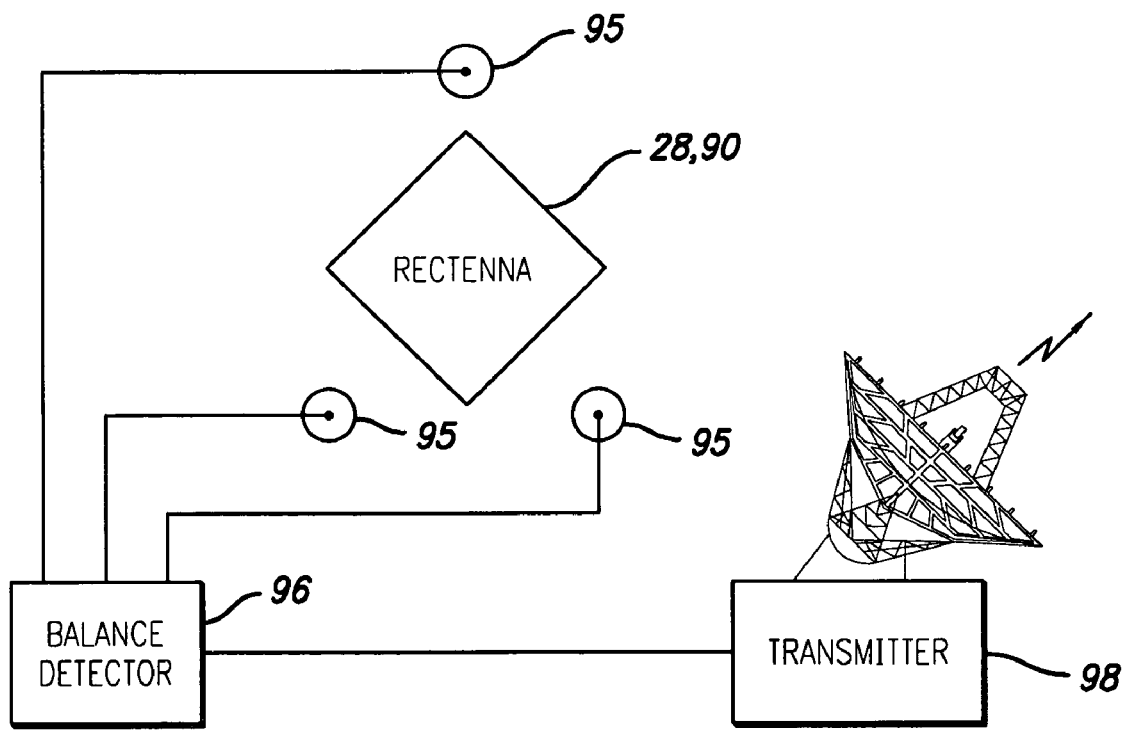
FIG. 10 illustrates a focus control system for use at a temporary or permanent rectenna facility forming part of the power distribution system.

FIG. 10 illustrates an automatic directional or focus control assembly for use at a permanent or temporary rectenna station 28, 62, or 90 for focusing the microwave beam at the desired rectenna site or sites. Signal detectors 95 are deployed in at least three locations about the perimeter of the rectenna station. The intensity of the incoming beam is monitored. Upon a detected imbalance of the incoming power beam by balance or variation detector 96, appropriate control signals and information on the direction and amount of the imbalance are transmitted to transmitter 98, which transmits signals to the satellite for making appropriate adjustments to the focus and direction of the transmission. Upon refocusing and/or redirecting of the incoming power beam, the detectors confirm the rebalance and proper orientation of the incoming beam. This feedback system ensures maintenance of proper focusing of the power beam onto the rectenna station. The detector system can also cut off the power beam.

Figure 11:
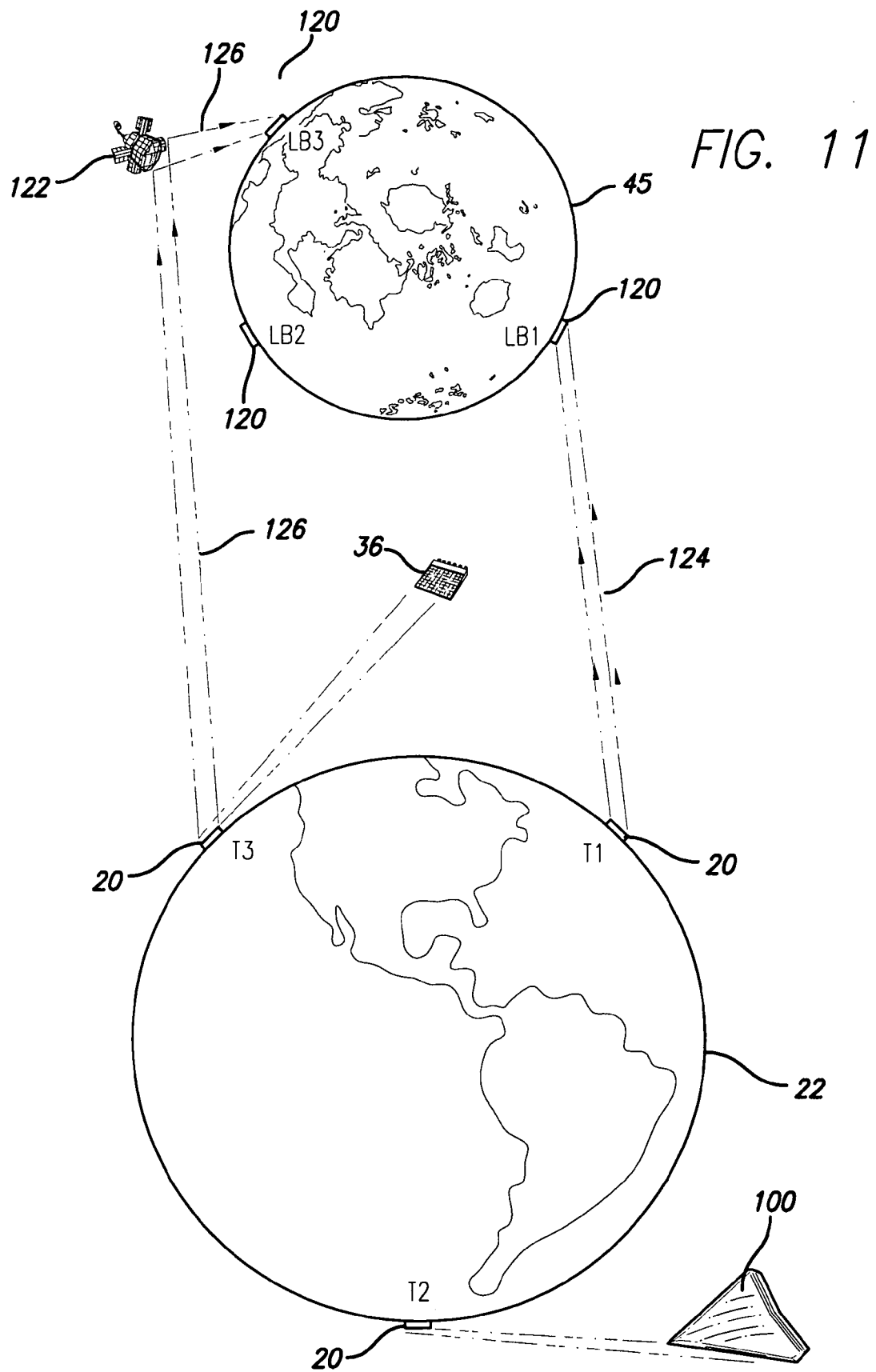
FIG. 11 illustrates a system according to another embodiment of the invention which uses the system of FIG. 8 to power lunar bases directly from Earth and also by means of redirected beams.

FIG. 11 is a schematic illustration of a system for powering lunar bases 120 from Earth, for example, T1, T2 and T3 of FIG. 11 both directly via beams 124, and by means of beams 126 redirected from orbital beam redirectors 122. The beam redirectors 122 enable transmission of power to receivers or rectenna facilities 120 at lunar bases, for example, LB1, LB2 and LB3 of FIG. 11, on the far side of the Moon at any time. For the purpose of this application, the far side of the Moon means the side facing away from the Earth at any instance in time, i.e. not in direct line of sight from the Earth or a satellite in orbit about the Earth. Power beams may also be directed to space tugs or transport vessels 36 between the Earth and the Moon, or orbiting the Earth or the Moon. Beam redirector satellites 122 about the Moon can also direct the beam to space tugs on the far side of the Moon. As indicated in FIG. 11, any transmitter 20 may also transmit power beams to power an aerospace plane or flying wing vehicle 100 as described above in connection with FIGS. 12 and 13.

An Earth-based power-generating and distribution system and method as described above has many advantages over conventional systems. This system can be used to electrically power transport systems between the Earth and the Moon and to power operations on the Moon, including operations for building lunar solar power stations.

The Earth-based system also has many advantages over current methods of distributing power to populated areas on Earth. Current major fuel sources for power generation are oil, coal, natural gas, nuclear fuels and biomass. One problem with fossil fuel sources is that they are often not found in convenient locations for immediate use in generating electricity, and often must be transported by pipelines, trains, ships, and other vehicles to a power plant for conversion into electricity, with associated risk of accidents or terrorism, and with huge expense. This contributes significantly to the high price of electricity. Another problem is that some fuel sources are in remote areas, contributing to the transportation expense. It is also difficult to recover a large amount of the fuel such as oil or natural gas, requiring expensive secondary or enhanced oil or gas recovery techniques. Finally, a significant percentage of a fuel such as natural gas is lost in liquefaction, handling, and transporting to the electricity-generating plant.

The unified power-generating and transmission system of FIG. 8 overcomes most or all of these problems. First, the power-generating plant can be located immediately adjacent the fuel source, eliminating the costs, dangers, and losses associated with transportation to a remote power-generating plant. This also means that the percentage of a fuel such as natural gas normally lost during transportation (typically around five percent) is retained and can be used directly to generate electricity. Second, the location of power generation and beaming facilities close to stranded gas or other fuel resources significantly reduces the cost of exploiting such sources. Third, by collecting waste gas, primarily carbon dioxide, created by the power-generating plant, and injecting the gas directly back into the adjacent oil or gas field, recovery of oil or gas can be increased at little additional expense. This technique also reduces pollutants released into the atmosphere. This type of facility makes injection of carbon dioxide or the like for enhanced fuel recovery more economically feasible, since the recovered waste gases do not have to be transported to a remote site, but can be re-injected on the spot into the adjacent fuel supply or bed.

The transmitter at the power-generating and distribution facility can be an open, grid-like surface as discussed above, which can allow the microwave beam to be transmitted through sunlight, rain, and wind. Careful design will permit fuel extraction and beaming facilities to have a minimum footprint on the land and to be readily removable when the fuel supply is exhausted.

The terrestrial power-generating and beaming system of this invention will provide a work force that is skilled in this field and can create a work force and business structure for expanding the system on Earth and also developing a lunar solar power station on the Moon. This system can potentially enable cost-effective implementation of a lunar solar power station which can convert solar power into microwaves for beaming to the same power receiving or rectenna stations on Earth which are used in the terrestrial system. The Earth-based power beaming facilities can be used to provide low cost power for space travel and transportation of materials to the Moon, as described above, as well as for directly beaming power to the Moon to provide electricity for lunar operations.

A major physical advantage of locating solar collectors on the Moon rather than the Earth is that mirrors can be used on the Moon to concentrate sunlight on the solar-to-electric converters, so that much less area of solar cell is needed per unit of power output. Orbiting solar reflectors are practical for the Moon due to the airless and cloudless lunar surface. The glass modules required to place 20 GWe/y of new commercial photovoltaic solar power systems on Earth, over 50 years is estimated to be of the order of 223,000 $km^2$/year. This is fifty four times the production of all sheet glass in the world in the year 2000. To provide 2 kWe/y would require the production of 520 $m^2$/year of glass modules, which is far beyond the per capita glass production in developed nations. Other specialty materials which could be used for solar converters are also not feasible due to the large solar cell area required on Earth, where solar concentrators are not practical. Such solar converters on Earth would require huge increases in terrestrial production of the specialty materials required. Thus, even though small scale solar energy collectors are feasible on the Earth, such systems are not able to provide significant affordable power in place of current non-renewable power sources, and cannot be expanded due to the material availability limitations.

A lunar solar power station avoids these problems by the use of solar concentrators or reflectors which reduce the solar cell area requirements. This greatly reduces the total mass of common materials required, such as glass, plastic, concrete, steel, aluminum, and copper. These reductions bring to within reason the acquisition of 20 TWe of electric power from the Moon and avoid the need for massive increases in production of these materials on the Earth in attempting to acquire the same level of solar electric power. The power-generating and distribution system and method of this invention makes the construction of one or more lunar solar power stations on the Moon more economically feasible, by providing power beams for cheap transportation of materials to the Moon for construction of such stations, as well as direct power for operating such stations during construction.

Other advantages of this system are that it will extend the useful life of oil fields and therefore increase the economic value to the field owners and power companies, such as ExxonMobil and nations such as the United States or Saudi Arabia, and that it will provide "greener" or more environmentally friendly power in a cost-effective manner. It can also enable synergistic use of several types of co-located power sources, and provide dependable load-following power at the local and regional grid level. The elimination of the need to transport potentially dangerous and explosive fuels about the Earth will reduce exposure to long-term legal liabilities, and also reduce the need to intrude such transportation systems into diverse political regions. The system reduces expense by significantly reducing the need for massive physical assets such as pipelines, ships, port facilities, power lines, and the like, that are difficult to maintain and protect.

Low cost electricity that is clean enables the economic production of fresh water from sea water or other brackish water and the recycling of consumer and agricultural water. Rectenna sites can be located in remote, unoccupied areas. Many industries, energy intensive farms, and fisheries can be located underneath or near rectenna sites.

Beamed power coming into the local biosphere from beyond Earth is environmentally neutral. It need not introduce net heat into the biosphere. Terrestrial transmitters that beam natural gas or oil energy from near the wells or other fossil fuel sources, enhanced by the beam redirector satellites, can open up areas to exploitation that are now off limits due to the difficulty in transporting natural gas or oil from such sites. By converting the fuel to electricity and then into one or more microwave beams on site, such transportation problems are completely eliminated. The rectenna sites which receive beamed power from the orbiting redirector satellites output pure electricity for direct consumption by customers. This system can significantly reduce the cost of electricity so that it could be made available to more people around the world. As the cost of electricity becomes cheaper, it will become more feasible to produce fuel such as hydrogen from water, and to make synthetic fuel, reducing the reliance on the fossil fuel supply which will inevitably become depleted.

The system of this invention is extremely versatile, since many different power beams may be emitted from many locations around the Earth, and directed to many different satellites and receiver or rectenna sites around the world, as well as into space for space transportation purposes, and directly to lunar bases. The microwave energy of this system has essentially no latency and can almost instantaneously be redirected as compared with the latency of oil in a pipeline, for example.

The centralized facilities adjacent fuel sources can be of larger capacity than local power stations and obtain an additional economy of scale. The problems of reduced demand at a local power station during the night are greatly reduced, since the power-generating station is remote from the local power grids. It can be operated at full capacity around the clock, simply directing power via the redirector satellites to rectenna sites where the power demands are greatest at any instant in time. The power is redistributed as needed during each twenty four hour period, as different parts of the world are in daytime and nighttime. This can potentially result in around 10% increase in gross revenue.

In the embodiment of FIG. 8 where waste gases are captured and injected into the oil or gas bed, the normal physical pollution (carbon dioxide, acid rain) associated with power plants is substantially reduced or eliminated. These pollution effects, in addition to dust and ash, are eliminated as issues for local government bodies, since the power facility is not located adjacent the population area. The risk of power plant failure and supply and capacity uncertainty is also eliminated as a local government issue. Instead, the only local facilities are the rectenna sites, where there is no pollution and little risk of accidents causing damage.

The terrestrial power transporting and distribution system of this invention, whether used alone or in conjunction with a lunar solar power station, completely eliminates the need for energy supply lines to ships and to land operations. It can provide energy at a more stable cost to civilian and defense interests. It also enables coded bi-static radar in which U.S. ships, planes and other facilities need not emit radar beams and can be completely stealthy. It also enables vastly greater continuous monitoring of global activities at very low cost, due to the reduced costs of placing monitoring stations in orbit.

Although some exemplary embodiments of the invention have been described above by way of example only, it will be understood by those skilled in the field that modifications may be made to the disclosed embodiments without departing from the scope of the invention, which is defined by the appended claims.

I claim:

1. A terrestrial based electrical power distribution system, comprising:
- a terrestrial supply of fuel taken from the list of oil, natural gas or coal;
- a terrestrial electrical power plant that uses these fuels to generate electricity;
- a terrestrial microwave generator connected to the terrestrial electrical generator that generates terrestrial microwave signals;
- a terrestrial microwave phased array transmitter, having a radiating aperture, that transmits and focuses a first microwave power beam, the terrestrial microwave transmitter receiving the terrestrial microwave signals from the terrestrial microwave generator;
- a first terrestrial receiver rectenna coupled to a first electrical power grid;
- a second terrestrial receiver rectenna coupled to a second electrical power grid, the second terrestrial rectenna being distant from the first terrestrial rectenna;
- a first redirector satellite orbiting earth, the first redirector satellite comprising;
- a satellite microwave receiver rectenna that receives the first microwave power beam from the terrestrial microwave transmitter;
- a satellite electrical generator that converts the first microwave power beam from the satellite receiver into satellite electricity;
- a satellite microwave generator connected to the satellite electrical generator that generates a plurality of microwave signals;
- a plurality of satellite microwave phased array transmitters each having respective radiating apertures;
- a satellite electricity management control that allocates the satellite electricity into a first portion that powers the first redirector satellite and a second portion provided to the satellite microwave generator;
- the satellite microwave generator responsive to the electrical management control converts the second portion of satellite electricity into the plurality of satellite microwaves signals that are respectively provided to the plurality of satellite microwave transmitters suitable for independent simultaneous transmission;
- a second redirector satellite orbiting earth comprising the elements corresponding to those elements of the first redirector satellite;
- the first redirector satellite independently aims and independently focuses a second microwave powered beam onto the second redirector satellite and simultaneously a third microwave power beam onto the first terrestrial rectenna having a first power demand;
- the second redirector satellite receives the second microwave power beam, converts the second microwave power beam into a fourth microwave power beam, and independently aims and independently focuses the fourth microwave power beam onto the second terrestrial rectenna having a second power demand;
- the respective radiating apertures of the terrestrial microwave transmitter, the plurality of satellite microwave transmitters of the first redirector satellite and the plurality of satellite microwave transmitters of the second redirector satellite have respective diameters such that distances to the respective satellite microwave receiver of the first redirector satellite, the first terrestrial rectenna and the second terrestrial rectenna is less that the respective diameters squared divided by the respective wavelength of the respective microwave signals;
- the satellite electricity control allocates the second portion of satellite electricity to the plurality of satellite microwave transmitters responsive to the respective power demands of respective rectenna; and
- a satellite focus control that independently aims the respective microwave power beams to the associated receiving rectenna and further independently focuses the respective microwave power beams onto the associated rectenna.

* * * * *